(12) United States Patent
Todd et al.

(10) Patent No.: US 8,972,490 B1
(45) Date of Patent: Mar. 3, 2015

(54) USER DISCOVERY IN SOCIALLY-AWARE DATA STORAGE SYSTEMS

(75) Inventors: Stephen Todd, Shrewsbury, MA (US); Mich Fisher, Natick, MA (US); Wayne Pauley, Hudson, NH (US)

(73) Assignee: EMC Corporation, Hopkinton, MA (US)

( * ) Notice: Subject to any disclaimer, the term of this patent is extended or adjusted under 35 U.S.C. 154(b) by 140 days.

(21) Appl. No.: 13/537,405

(22) Filed: Jun. 29, 2012

(51) Int. Cl.
*G06F 15/16* (2006.01)
*H04L 29/06* (2006.01)

(52) U.S. Cl.
CPC ................ *H04L 29/06047* (2013.01)
USPC ...................................................... 709/203

(58) Field of Classification Search
CPC ....... G06Q 50/01; G06Q 99/00; G06Q 30/02; G06Q 30/0631; H04L 67/22; H04L 65/403; G06F 17/30867
See application file for complete search history.

(56) References Cited

U.S. PATENT DOCUMENTS

| | | | | |
|---|---|---|---|---|
| 7,886,000 | B1* | 2/2011 | Polis et al. | 709/203 |
| 2006/0074973 | A1* | 4/2006 | Platt et al. | 707/102 |
| 2009/0024548 | A1* | 1/2009 | Zhu et al. | 706/21 |
| 2009/0106043 | A1* | 4/2009 | Buckwalter et al. | 705/1 |
| 2012/0041907 | A1* | 2/2012 | Wang et al. | 706/12 |
| 2012/0084349 | A1* | 4/2012 | Lee et al. | 709/203 |
| 2012/0226991 | A1* | 9/2012 | Drennan et al. | 715/738 |
| 2013/0031090 | A1* | 1/2013 | Posse et al. | 707/723 |
| 2013/0103758 | A1* | 4/2013 | Alison et al. | 709/204 |
| 2013/0132865 | A1* | 5/2013 | Li | 715/758 |

OTHER PUBLICATIONS

Tim Berners-Lee, "Socially Aware Cloud Storage," http://www.w3.org/DesignIssues/CloudStorage.html, Sep. 2011, 10 pages.
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Brian J Gillis
*Assistant Examiner* — Austin Moreau
(74) *Attorney, Agent, or Firm* — Ryan, Mason & Lewis, LLP

(57) ABSTRACT

Information processing techniques for managing user discovery requests in a computing system such as a socially-aware data storage system. In one example, a method comprises the following steps. A user discovery request is sent from a first client to a socially-aware data storage system. The user discovery request comprises a social score computed for the first client. A list of other clients associated with the socially-aware data storage system is received at the first client from the socially-aware data storage system. The list of other clients is based on the social score computed for the first client.

20 Claims, 5 Drawing Sheets

USER DISCOVERY IN SOCIALLY-AWARE DATA STORAGE SYSTEMS

FIELD

The field relates to information processing, and more particularly to information processing techniques for managing user discovery requests in a computing system such as a socially-aware data storage system.

BACKGROUND

It is known that social networking websites (e.g., Facebook, Twitter, LinkIn, Google+, etc.) typically store user data objects on storage systems dedicated to their particular websites. That is, application programs written for and that run on a particular social networking website access data using dedicated application programming interfaces that are written for a specific social networking website storage system. Thus, it can be problematic when a user wishes to access one of his/her data objects stored on a first social networking website from a second social networking website. Typically, this involves the second social networking website requesting access to the data object from the first social networking website. Such data access requests are known to raise authentication issues.

Also, existing social networking websites are known to provide a user issuing a user discovery command with a list of other users of the website, which can also lead to access by the requesting user of data stored on behalf of these other users.

SUMMARY

Embodiments of the present invention provide information processing techniques for managing user discovery requests in a computing system such as a socially-aware data storage system.

In one embodiment, a client-based method comprises the following steps. A user discovery request is sent from a first client to a socially-aware data storage system. The user discovery request comprises a social score computed for the first client. A list of other clients associated with the socially-aware data storage system is received at the first client from the socially-aware data storage system. The list of other clients is based on the social score computed for the first client.

In another embodiment, a socially-aware data storage system-based method comprises the following steps. A user discovery request is received from a first client at a socially-aware data storage system. The user discovery request comprises a social score computed for the first client. A list of other clients associated with the socially-aware data storage system is sent to the first client from the socially-aware data storage system. The list of other clients is based on the social score computed for the first client.

In a further embodiment, a computer program product is provided which comprises a processor-readable storage medium having encoded therein executable code of one or more software programs. The one or more software programs when executed by a processor of a processing device implement steps of one of the above-described method.

In yet another embodiment, an apparatus comprises a memory and a processor operatively coupled to the memory and configured to perform steps of one of the above-described method.

Advantageously, embodiments described herein prevent a first client of a socially-aware data storage system from discovering a second client of the system when the social profile (characterized by the social score) of the first client is, for example, unappealing or worrisome to the second client.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Also, while embodiments of the invention are illustratively described herein from the perspective of a client's personal information, the same user discovery request management techniques are applicable in a business environment or any other data storage environment.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

The concept of a "socially-aware data storage system" is proposed whereby social network user data is stored on a data storage system independent of any particular social networking website. Thus, in contrast to existing social networking website data storage arrangements, application programs running on multiple social networking websites can access user data objects from the socially-aware data storage system. Likewise, users themselves can access their data on the data storage system regardless of which social networking websites they are registered on.

While a socially-aware data storage system solves many of the data access problems with the existing social networking website environment mentioned above in the background section, users still desire safeguards with regard to their data wherever it is stored. Embodiments of the invention provide such safeguards and other advantages, as will be explained in detail herein.

Figure 1A:
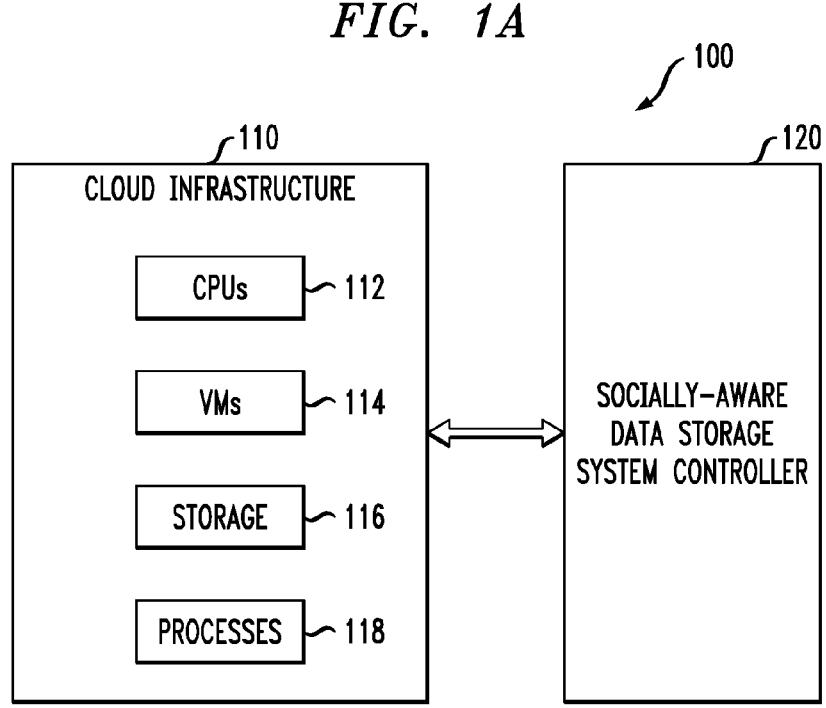
FIG. 1A shows cloud infrastructure and a socially-aware data storage system controller, in accordance with one embodiment of the invention.

FIG. 1A shows a system 100 configured in accordance with an illustrative embodiment of the present invention. The system 100 comprises cloud infrastructure 110 and a socially-aware data storage system controller 120. As will be explained in detail below, the socially-aware data storage system controller 120 manages, inter alia, user discovery requests submitted by clients to a socially-aware data storage system implemented on the cloud infrastructure 110. As will be explained in detail herein, controller 120 utilizes social scores computed for clients of the data storage system to determine a response to a user discovery request. As used herein, the phrase "user discovery request" can include a client request for a list of other clients in the data storage system and/or a request for discovery of data objects stored on the data storage system on behalf of other clients.

Furthermore, as used herein, the phrase "data object" or simply "object" refers to any given data item or data unit that may be part of an information network and/or storable on a socially-aware data storage system. An object or data object may take on any form and it is to be understood that the invention is not limited to any particular form. For example, an object may be electronic data such as one or more web pages, documents, records, files, images, videos, user status information, personal or business profile information, or any other type of data set, data item, or data unit. Thus, embodiments of the invention are not limited to any particular type of data object.

Cloud infrastructure 110 is illustratively depicted in the figure as comprising an execution environment with execution components comprising one or more central processing units (CPUs) 112, one or more virtual machines (VMs) 114, and storage devices 116 (upon which logical units (LUs) are implemented) that execute one or more processes 118 that operate on one or more process input data sets that generate one or more process output data sets. It is assumed that a socially-aware data storage system is implemented within this execution environment.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the controller 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
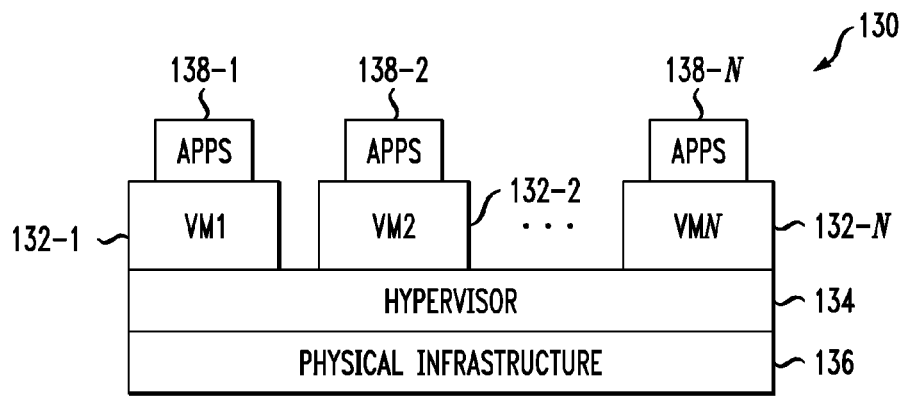
FIG. 1B shows a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134, as mentioned above, is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUs) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 134 which, as shown in FIG. 1B, is directly inserted on top of the computer hardware in order to allocate hardware resources of the physical computer (physical infrastructure 136) dynamically and transparently. The hypervisor 134 affords the ability for multiple operating systems to run concurrently on a single physical computer and share hardware resources with each other.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
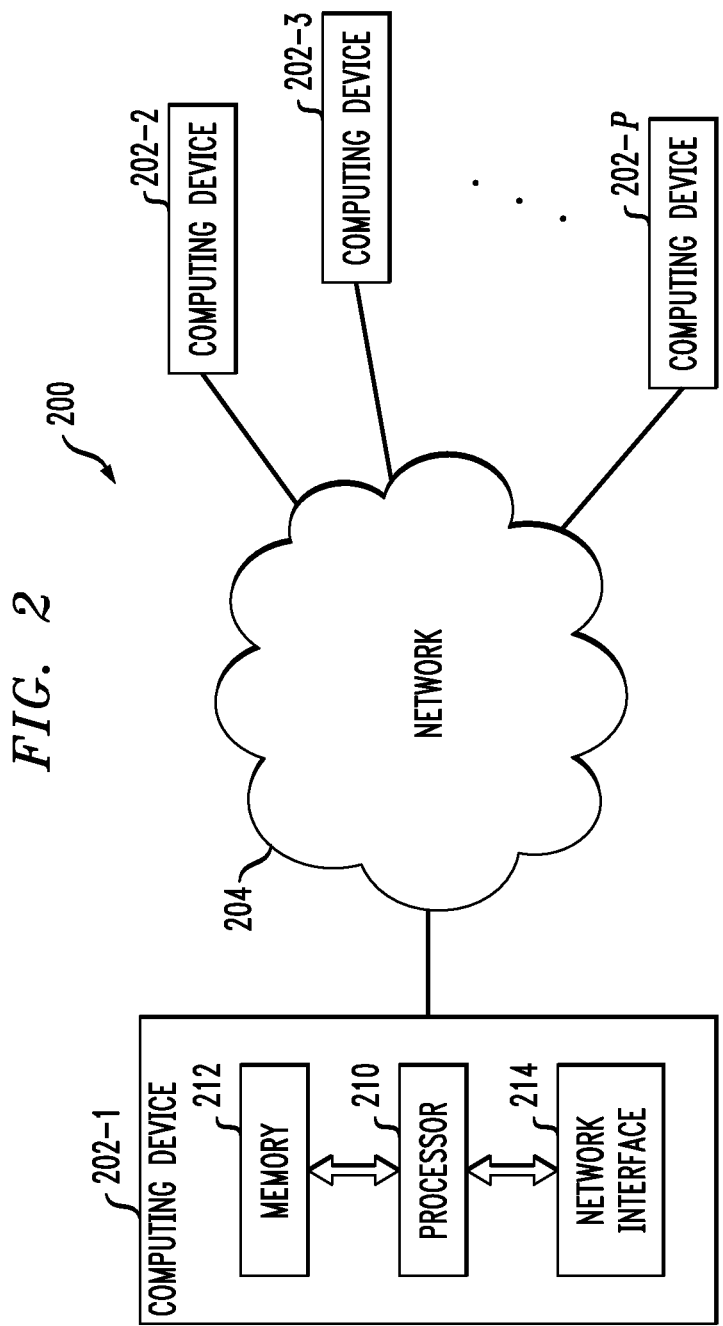
FIG. 2 shows a processing platform on which the cloud infrastructure and the socially-aware data storage system controller of FIG. 1A are implemented, in accordance with one embodiment of the invention.

An example of a processing platform on which the cloud infrastructure 110 and/or the controller 120 of FIG. 1A may be implemented is processing platform 200 shown in FIG. 2. The processing platform 200 in this embodiment comprises at least a portion of the system 100 and includes a plurality of computing devices, denoted 202-1, 202-2, 202-3, . . . 202-P, which communicate with one another over a network 204. One or more of the elements of system 100 may therefore each run on a server, computer or other processing platform element, which may be viewed as an example of what is more generally referred, to herein as a "computing device" or a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The computing device 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the computing device 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the computing device 202-1 is network interface circuitry 214, which is used to interface the computing device with the network 204 and other system components. Such circuitry may comprise conventional transceivers of a type well known in the art.

The other computing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

Illustrative details of user discovery management techniques, as well as operations of elements of controller 120 and a corresponding socially-aware data storage system, will now be described with reference to FIGS. 3 through 6.

Figure 3:
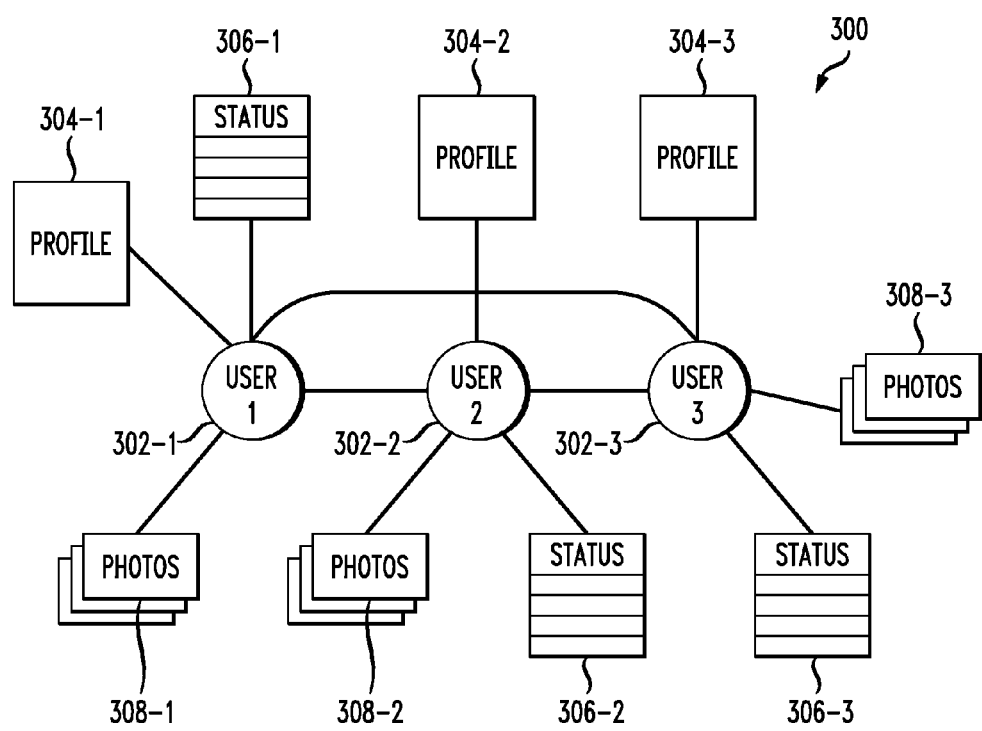
FIG. 3 shows an example of a graph-like data structure used to store user data in a socially-aware data storage system, in accordance with one embodiment of the invention.
Figure 4:
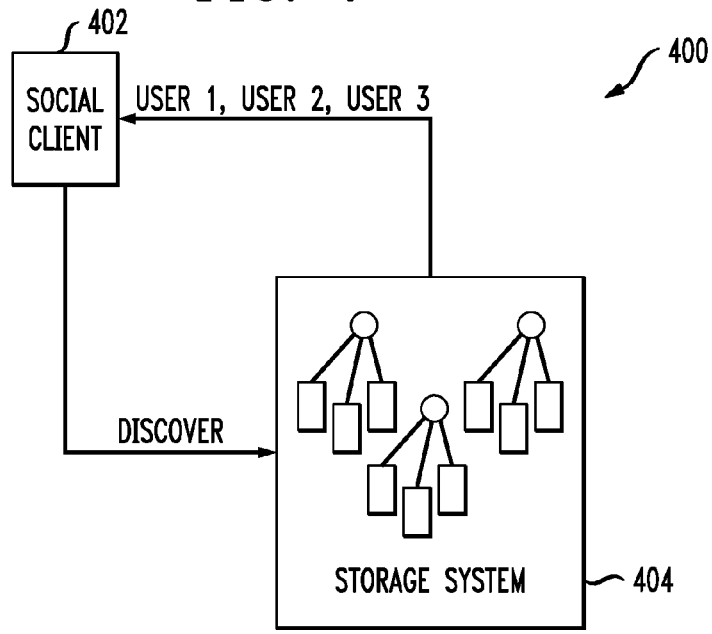
FIG. 4 shows a user discovery request protocol without use of social score in a socially-aware data storage system, in accordance with one embodiment of the invention.

Consider a socially-aware data storage system, such as may be implemented in cloud infrastructure 110 in FIG. 1, which stores client's personal data in graph-like structures and maintains linkages to clients that are socially-near (i.e., friends). FIG. 3 shows an example of a graph-like data structure 300 used to store client data in a socially-aware data storage system. As shown, user 1 (302-1) stores data objects such as a social profile 304-1, status information 306-1, and photos 308-1. Likewise, user 2 (302-2) stores data objects such as a social profile 304-2, status information 306-2, and photos 308-2; while user 3 (302-3) stores data objects such as a social profile 304-3, status information 306-3, and photos 308-3. There are only three users (clients) illustrated in FIG. 3 for the sake of simplicity. Of course, the data structure 300 can typically store data associated with many more users as part of the socially-aware data storage system.

Assume now that user 2 wishes to be "undiscovered" by friends of user 1 and/or user 3. In existing social networking website systems and data storage systems associated therewith, the "status" or "wall" for user 1 may reveal information about user 2, or data objects stored by user 2, that user 2 wishes to remain undiscoverable. A "get all" or "discover" command issued by a super-user of the storage system may be able to view all friends (i.e., user 1, user 2, and user 3). This is illustrated in protocol 400 of FIG. 4. As shown, when social client 402 issues a user discovery request to data storage system 404, a list with user 1, user 2, and user 3 is provided to the social client 402 in response. Also, data objects stored by user 1, user 2, and user 3 on data storage system 404 may typically now be accessible by the social client 402, or at least, the social client 402 will be aware that such data objects exist.

While security techniques may be used to block the discover command (i.e., in a brute-force manner), there is no intelligent technique or mechanism to respond to a client discover command with a filtered view based on the social profile of the client. Embodiments of the invention provide such intelligent techniques and mechanisms that are able to respond to a client discover command with a filtered view based on the social profile of the client.

Figure 5:
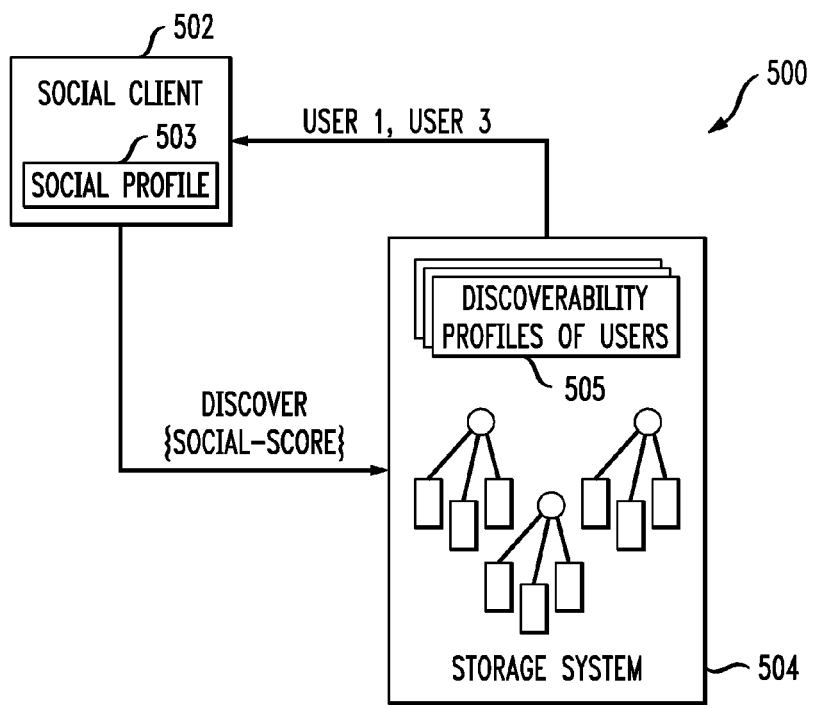
FIG. 5 shows a user discovery request and social score protocol in a socially-aware data storage system, in accordance with one embodiment of the invention.

In accordance with one embodiment, a social score is computed for a client and included as part of a user discovery request issued by the client. This is illustrated in protocol 500 in FIG. 5. More particularly, FIG. 5 shows a user discovery request and social score protocol in a socially-aware data storage system, in accordance with one embodiment of the invention. As shown, a social client 502 sends a user discovery request to a socially-aware data storage system 504. The user discovery request includes a social score computed for social client 502. In response, the storage system 504 sends the client 502 a list of other clients associated with the socially-aware data storage system, whereby the list of other clients is based on the social score computed for the client 502.

In this example, note that user 2 is not identified in the returned list (only user 1 and user 3 are identified). This means that the social score sent by client 502 is not acceptable to user 2 and thus the social score prevents user 2 and his/her data from being discovered by client 502.

It is to be understood that the social score in the discovery command is algorithmic in nature. In one embodiment, the client issuing the command runs an algorithm over his/her social profile 502. This algorithm results in a numerical profile (embodied by the social score) which describes such attributes as client preferences, interests, social circles (i.e., relationships of the client), and types of data stored on the system 504 by the client.

By way of example only, the computed social score could be key/value pairs where the key is an interest (e.g., sports) and the value is a range (e.g., 1-10). So a given client could have a high interest score for sports (e.g., 9) and a low interest score in poetry (e.g., 1). These pairs can be calculated by scanning content on the client's social networking website page (e.g., Facebook wall) and counting words.

Another way to compute the social score can be via known Social Network Analysis (SNA) techniques. That is, one or more SNA techniques can analyze who a given client's friends are and what collaborations they have with each other. An analysis of these relationships can generate SNA metrics such as betweenness centrality, clustering coefficients, and other types of known mathematical scores. It is to be appreciated that the above algorithms for computing the social score of a client are intended to be non-limiting examples. Those of ordinary skill in the art will realize alternative methods for computing social scores given the illustrative teachings herein.

Then, upon receipt by the data storage system 504, the social score is unpacked, analyzed and compared against a discoverability profile 505 of each other user (or some subset of users) of the data storage system 504. The discoverability profile 505 describes what types of people by which each user is interested in being discovered. Thus, the list of other clients received by the social client 502 from data storage system 504 contains one or more other clients of the data storage system 504 having respective discoverability profiles 505 that are substantially consistent with the social profile 503 of the client 502. A given discoverability profile 505 of a given client thus characterizes a type of other client of the data storage system 504 for which the given client authorizes discovery, and/or access to his/her data.

In another embodiment, the data storage system 504 runs an algorithm over the discoverability profiles 505 of its users (or some subset thereof) and generates a social score for each user. This algorithm, like the one described above that is run on the client device of the requesting client, results in a numerical profile (embodied by the social score) which describes what types of people by which each user is interested in being discovered. In such an embodiment, the data storage system 504 compares the social score received from the client issuing the user discovery request with the social scores computed over the discoverability profiles of the other clients of the data storage system 504. For those other clients whose social scores are substantially similar or consistent with the social score of the requesting client, they will be included in the list sent back to the requesting user.

Accordingly, it is to be appreciated that a given client thus has a social profile and a discoverability profile associated therewith, each of which may be invoked depending on whether the given client is issuing a discovery request or is being considered for inclusion in a list returned in response to a user discovery request of another client.

Figure 6:
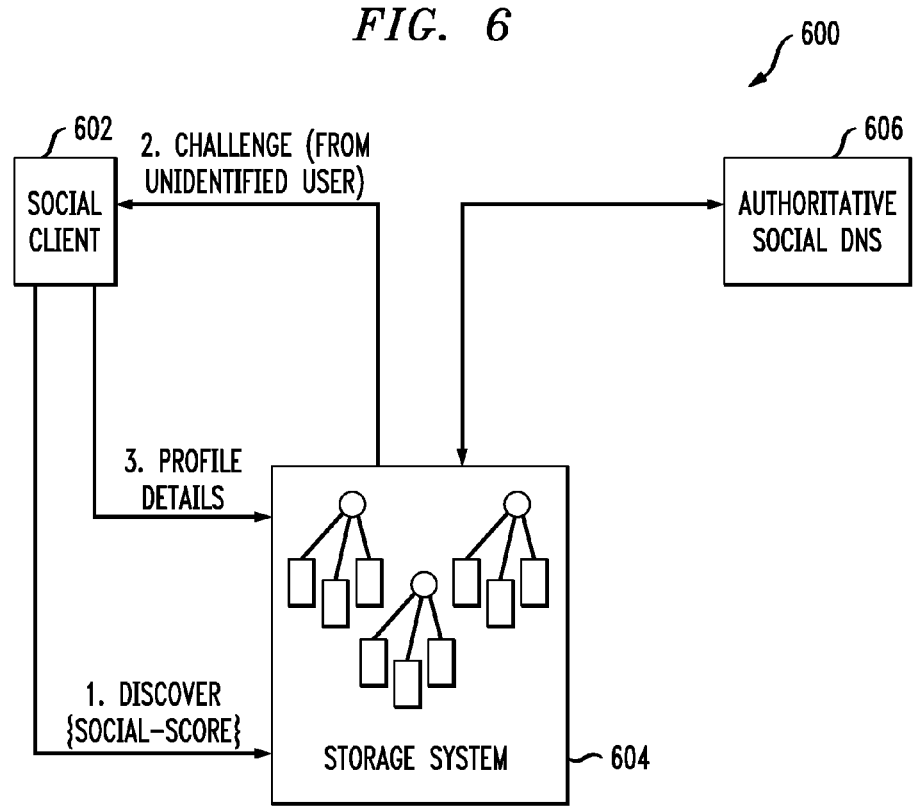
FIG. 6 shows a user discovery request, social score and challenge protocol in a socially-aware data storage system, in accordance with one embodiment of the invention.

FIG. 6 shows a user discovery request, social score and challenge protocol 600 in a socially-aware data storage system, in accordance with one embodiment of the invention. That is, after social client 602 sends a user discovery request with his/her computed social score included therein to data storage system 604, the client 602 receives a challenge request for additional information prior to receiving the list of other clients from the data storage system 604. Note that the client who requested the additional challenge remains unidentified to client 602. As shown, the challenge request is generated by a social authority entity associated with the socially-aware data storage system 604. In one example, as shown in FIG. 6, the social authority entity is an authoritative social domain name server (DNS) 606. Other entities may initiate and generate the challenge, or the data storage system 604, itself, could initiate and generate it as well. In response to the challenge request, the social client 602 sends further social profile details.

The data storage system 604 uses this additional information, along with the computations described above in the context of FIG. 5, to determine which clients should and should not be in the list of discovered clients. Thereafter, the list of other clients that are intended to be discoverable is provided to social client 602 by the data storage system 604.

It is to be appreciated that the social client 602 is also given access to one or more data objects associated with clients on the list of other clients that are stored on the data storage system 604. Also, advantageously, in accordance with data storage system 604, one or more data objects, associated with one client, are stored in near proximity within the data storage system 604 to one or more data objects associated with one or more other clients of the data storage system 604 when the social score of the one client is substantially similar or consistent with social scores of the one or more other clients. Near proximity may mean that data is stored on the same computing device, or two or more computing devices in close physical proximity, in the data storage system 604.

Note also that at least a part of controller 120 as shown in FIG. 1A can be implemented on storage system 504/604 to perform the functions described herein. Likewise, part of the controller function can be implemented on the client (device) 502/602 to perform operations associated with the client.

We now give a few non-limiting examples of the usage of the social score-based user discovery protocol according to one or more embodiments of the invention.

In a first example, assume that a data object from Bob (a first client) is going to be stored on a socially-aware data storage system. The object includes metadata describing Bob in terms of metadata that Bob has chosen to include in his social profile. Due to the nature of the disclosures, Alice (a second client) is interested in a data object of Bob and is allowed access to it when they both have a common social score.

In a second example, assume that Bob's data object placed on the data storage system was noted by Eve (a third client) who has a social score close to Alice's social score (and/or discoverability profile). Assuming Eve is friends with Alice, she discovered Bob's data object being stored as an event. However, because of how Bob set up his social score filtering according to an embodiment of the invention, Eve does not have access to the object and can only ask Bob directly for access.

In a third example, because Alice has a common social score with respect to Bob, when she stores objects on the system, she inherits Bob's placement policies putting her objects nearest to his, which are also tiered and protected with the same controls. That is, the step of the socially-aware data storage system (504/604) stores data objects in accordance with substantially similar storage conditions for two or more clients having substantially similar social scores.

In a fourth example, if client A (who is a member of a sales team in New England) is storing a customer account list for New England on the data storage system, all the members of the New England sales team would have access to the data, and they in turn would have their account specific data stored by the data storage system in near proximity to the account list data.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
   sending, from a first client, a user discovery request to a socially-aware data storage system, the user discovery request comprising a social score computed for the first client, wherein the social score is computed for the first client based on a social profile of the first client and the social score comprises one or more measures computed for one or more attributes specified in the social profile of the first client; and
   receiving, at the first client from the socially-aware data storage system, a list of other clients associated with the socially-aware data storage system, the list of other clients being based on the social score computed for the first client, wherein the list of other clients received by the first client contains one or more other clients of the socially-aware data storage system having respective discoverability profiles that are substantially consistent with the social profile of the first client, and a given discoverability profile of a given client characterizes a type of other client of the socially-aware data storage system for which the given client authorizes discovery;

wherein one or more data objects associated with the first client are stored in near physical proximity within the socially-aware data storage system to one or more data objects associated with one or more other clients of the socially-aware data storage system when the social score of the first client is substantially similar with social scores of the one or more other clients;

wherein the above steps are performed by at least one processing device comprising a processor coupled to a memory.

2. The method of claim 1, wherein the one or more attributes comprise at least one of one or more preferences of the first client, one or more interests of the first client, and one or more relationships of the first client.

3. The method of claim 1, further comprising the step of the first client receiving a challenge request for additional information after sending the user discovery request but prior to receiving the list of other clients.

4. The method of claim 3, wherein the challenge request is generated by a social authority entity associated with the socially-aware data storage system.

5. The method of claim 1, further comprising the step of the first client being given access to one or more data objects, associated with clients on the list of other clients, stored on the socially-aware data storage system.

6. A computer program product comprising a non-transitory processor-readable storage medium having encoded therein executable code of one or more software programs, wherein the one or more software programs when executed by the processor of the processing device implement the steps of the method of claim 1.

7. The method of claim 1, wherein the social score comprises a key and value pair wherein the key represents a topic and the value represents a value level attributable to the topic.

8. A method comprising the steps of:
receiving, at a socially-aware data storage system, a user discovery request from a first client, the user discovery request comprising a social score computed for the first client, wherein the social score is computed for the first client based on a social profile of the first client and the social score comprises one or more measures computed for one or more attributes specified in the social profile of the first client;

sending, from the socially-aware data storage system to the first client, a list of other clients associated with the socially-aware data storage system, the list of other clients being based on the social score computed for the first client, wherein the list of other clients received by the first client contains one or more other clients of the socially-aware data storage system having respective discoverability profiles that are substantially consistent with the social profile of the first client, and a given discoverability profile of a given client characterizes a type of other client of the socially-aware data storage system for which the given client authorizes discovery; and storing one or more data objects associated with the first client in near physical proximity within the socially-aware data storage system to one or more data objects associated with one or more other clients of the socially-aware data storage system when the social score of the first client is substantially similar with social scores of the one or more other clients;

wherein the above steps are performed by at least one processing device comprising a processor coupled to a memory.

9. The method of claim 8, further comprising the step of sending, from the socially-aware data storage system to the first client, a challenge request for additional information after receiving the user discovery request but prior to sending the list of other clients.

10. The method of claim 8, further comprising the step of the socially-aware data storage system giving access to the first client to one or more data objects, associated with clients on the list of other clients, stored on the socially-aware data storage system.

11. The method of claim 8, further comprising the step of the socially-aware data storage system storing data objects in accordance with substantially similar storage conditions for two or more clients having substantially similar social scores.

12. A computer program product comprising a non-transitory processor-readable storage medium having encoded therein executable code of one or more software programs, wherein the one or more software programs when executed by the processor of the processing device implement the steps of the method of claim 8.

13. The method of claim 8, wherein the social score comprises a key and value pair wherein the key represents a topic and the value represents a value level attributable to the topic.

14. An apparatus comprising:
a memory; and
a processor operatively coupled to the memory and configured to: send, from a first client, a user discovery request to a socially-aware data storage system, the user discovery request comprising a social score computed for the first client, wherein the social score is computed for the first client based on a social profile of the first client and the social score comprises one or more measures computed for one or more attributes specified in the social profile of the first client; and receive, at the first client from the socially-aware data storage system, a list of other clients associated with the socially-aware data storage system, the list of other clients being based on the social score computed for the first client, wherein the list of other clients received by the first client contains one or more other clients of the socially-aware data storage system having respective discoverability profiles that are substantially consistent with the social profile of the first client, and a given discoverability profile of a given client characterizes a type of other client of the socially-aware data storage system for which the given client authorizes discovery; wherein one or more data objects associated with the first client are stored in near physical proximity within the socially-aware data storage system to one or more data objects associated with one or more other clients of the socially-aware data storage system when the social score of the first client is substantially similar with social scores of the one or more other clients.

15. The apparatus of claim 14, wherein the processor is further configured to receive, at the first client, a challenge request for additional information after sending the user discovery request but prior to receiving the list of other clients.

16. The apparatus of claim 15, wherein the challenge request is generated by a social authority entity associated with the socially-aware data storage system.

17. The apparatus of claim 14, wherein the first client is given access to one or more data objects, associated with clients on the list of other clients, stored on the socially-aware data storage system.

18. The apparatus of claim 14, wherein the social score comprises a key and value pair wherein the key represents a topic and the value represents a value level attributable to the topic.

19. An apparatus comprising:
a memory; and
a processor operatively coupled to the memory and configured to: receive, at a socially-aware data storage system, a user discovery request from a first client, the user discovery request comprising a social score computed for the first client, wherein the social score is computed for the first client based on a social profile of the first client and the social score comprises one or more measures computed for one or more attributes specified in the social profile of the first client; send, from the socially-aware data storage system to the first client, a list of other clients associated with the socially-aware data storage system, the list of other clients being based on the social score computed for the first client, wherein the list of other clients received by the first client contains one or more other clients of the socially-aware data storage system having respective discoverability profiles that are substantially consistent with the social profile of the first client, and a given discoverability profile of a given client characterizes a type of other client of the socially-aware data storage system for which the given client authorizes discovery; and store one or more data objects associated with the first client in near physical proximity within the socially-aware data storage system to one or more data objects associated with one or more other clients of the socially-aware data storage system when the social score of the first client is substantially similar with social scores of the one or more other clients.

20. The apparatus of claim 19, wherein the social score comprises a key and value pair wherein the key represents a topic and the value represents a value level attributable to the topic.

* * * * *